United States Patent
Stukalov et al.

(10) Patent No.: US 10,365,815 B1
(45) Date of Patent: Jul. 30, 2019

(54) VERTICAL SCROLLING OF ALBUM IMAGES

(71) Applicant: WhatsApp Inc., Menlo Park, CA (US)

(72) Inventors: Dmitri Stukalov, Palo Alto, CA (US); Charles Donald Deets, Jr., Palo Alto, CA (US); Zafir Khan, Redwood City, CA (US)

(73) Assignee: WhatsApp Inc., Menlo Park, CA (US)

( * ) Notice: Subject to any disclaimer, the term of this patent is extended or adjusted under 35 U.S.C. 154(b) by 0 days.

(21) Appl. No.: 15/895,744

(22) Filed: Feb. 13, 2018

(51) Int. Cl.
*G06F 3/0485* (2013.01)
*G06F 3/0483* (2013.01)
*G06F 3/0484* (2013.01)
*G06F 3/0488* (2013.01)

(52) U.S. Cl.
CPC .......... *G06F 3/0485* (2013.01); *G06F 3/0483* (2013.01); *G06F 3/04845* (2013.01); *G06F 3/04886* (2013.01)

(58) Field of Classification Search
CPC ................................................... G06F 3/0485
USPC ....................................................... 715/784
See application file for complete search history.

(56) References Cited

U.S. PATENT DOCUMENTS

| | | | | |
|---|---|---|---|---|
| 7,478,321 B2 * | 1/2009 | Baudisch | ............. | G06F 16/338 715/243 |
| 8,813,133 B1 * | 8/2014 | DePrez | ................ | G06F 3/0481 725/61 |
| 9,361,011 B1 * | 6/2016 | Burns | ..................... | G06F 16/71 |
| 9,405,446 B1 * | 8/2016 | Haitani | ............... | G06F 3/04842 |
| 2002/0180803 A1 * | 12/2002 | Kaplan | ............ | H04L 29/06027 715/810 |
| 2008/0320393 A1 * | 12/2008 | Roberts | ............. | H04N 5/44543 715/721 |
| 2009/0300497 A1 * | 12/2009 | Billmaier | ............. | G06F 3/0482 715/716 |
| 2010/0174993 A1 * | 7/2010 | Pennington | ........... | G06F 1/1616 715/738 |
| 2010/0175022 A1 * | 7/2010 | Diehl | .................... | G06F 3/0481 715/784 |
| 2010/0211872 A1 * | 8/2010 | Rolston | ................ | G06F 3/0482 715/702 |
| 2010/0229130 A1 * | 9/2010 | Edge | ................... | G06F 3/04883 715/863 |
| 2011/0291945 A1 * | 12/2011 | Ewing, Jr. | ............ | G06F 1/1686 345/173 |
| 2012/0192121 A1 * | 7/2012 | Bonnat | ................ | G06F 3/0488 715/863 |

(Continued)

*Primary Examiner* — Daniel Rodriguez
(74) *Attorney, Agent, or Firm* — Fenwick & West LLP (57) ABSTRACT

Images are displayed in an album mode in which an image occupying a focus position is separated by bars from adjacent images in the album. The bars serve as a visual separator between the images and signify to a user that the images can be vertically scrolled. If the focus image occupies less than the full height of the screen, then part of the adjacent images are shown above and below the focus image. If the focus image occupies the full height of the screen, then the image is reduced in size to occupy less than the full height, causing the adjacent images to also be displayed. If the user scrolls the image, the image reduction decreases linearly with the scrolling until the image is shown at full height. Continued scrolling causes the image to move off the screen and the previous or next image to be displayed.

17 Claims, 9 Drawing Sheets

(56) References Cited

U.S. PATENT DOCUMENTS

| | | | |
|---|---|---|---|
| 2013/0212524 A1* | 8/2013 | Nurse | G06F 3/048 |
| | | | 715/788 |
| 2014/0096075 A1* | 4/2014 | King | G06F 16/58 |
| | | | 715/800 |
| 2014/0137020 A1* | 5/2014 | Sharma | G06F 3/0482 |
| | | | 715/769 |
| 2015/0339006 A1* | 11/2015 | Chaland | G06F 3/0482 |
| | | | 715/835 |
| 2016/0057154 A1* | 2/2016 | Ferguson | H04L 63/104 |
| | | | 726/7 |
| 2016/0088060 A1* | 3/2016 | Rahman | H04L 67/025 |
| | | | 715/740 |
| 2016/0239188 A1* | 8/2016 | Strong | G06F 3/04845 |
| 2016/0239197 A1* | 8/2016 | Strong | G06F 3/0485 |
| 2016/0315983 A1* | 10/2016 | Lewis | G11B 27/02 |
| 2016/0378308 A1* | 12/2016 | Blohowiak | G06F 3/04845 |
| | | | 715/745 |
| 2018/0197575 A1* | 7/2018 | Doherty | G06Q 30/0276 |

\* cited by examiner

VERTICAL SCROLLING OF ALBUM IMAGES

BACKGROUND

1. Field of the Invention

The subject matter described herein generally relates to electronic messaging and in particular to displaying an album of images shared among users of an electronic messaging system in a vertically-scrollable format.

2. Description of the Related Art

Electronic messaging as a means of communication has become increasingly popular. Users of electronic messaging systems often desire to share photos with others and view photos shared by others. Typical mobile devices used to facilitate electronic messaging tend to have touchscreens, and the trend over time has been to substitute physical buttons on the devices with touchscreen-based functionality. However, it is often difficult for users to identify and understand the controls available to them using the user interface of a touch screen. The screen has a limited size and much of the screen is usually devoted to displaying content. As a result, users may not realize that the user interface allows them to use particular functionality by interacting with the screen in a certain way.

One specific example of the problem described above occurs when viewing images. When viewing an image, the screen of the mobile device is typically occupied by the image itself. There may be user interface controls that a user can access to interact with the images, such as to view a different image. However, the controls may not be apparent to the user. One potential solution is to show the user interface controls on the screen in addition to the image, but showing controls has the potential to be intrusive and detract from the user experience.

SUMMARY

The above and other problems are addressed by displaying an album of images in a vertically-scrollable format. Users of multiple clients participate in a chat session by exchanging messages and images. The clients may provide images to a messaging server, and the messaging server distributes the images to the other clients. Images shared to a chat are stored in an album viewable to chat participants. When a user views an image in an album mode, the user can scroll vertically to transition through the other images in the album.

If a given image occupies less than the full height of the screen, then part of an adjacent image is shown above and/or below the primary image on the screen. The displayed part of the adjacent image serves as a visual signifier that the user can scroll up or down through the images.

If the primary image occupies the full height of the screen, then the image is reduced (e.g., cropped) to occupy less than the full height, causing the adjacent images to also be displayed. If the user scrolls the image, the image reduction diminishes linearly with the scrolling (i.e., the scroll causes the image to grow) until the image is shown at full height. Continued scrolling causes the image to move off the screen and the next image to be displayed.

The figures depict an embodiment of the invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
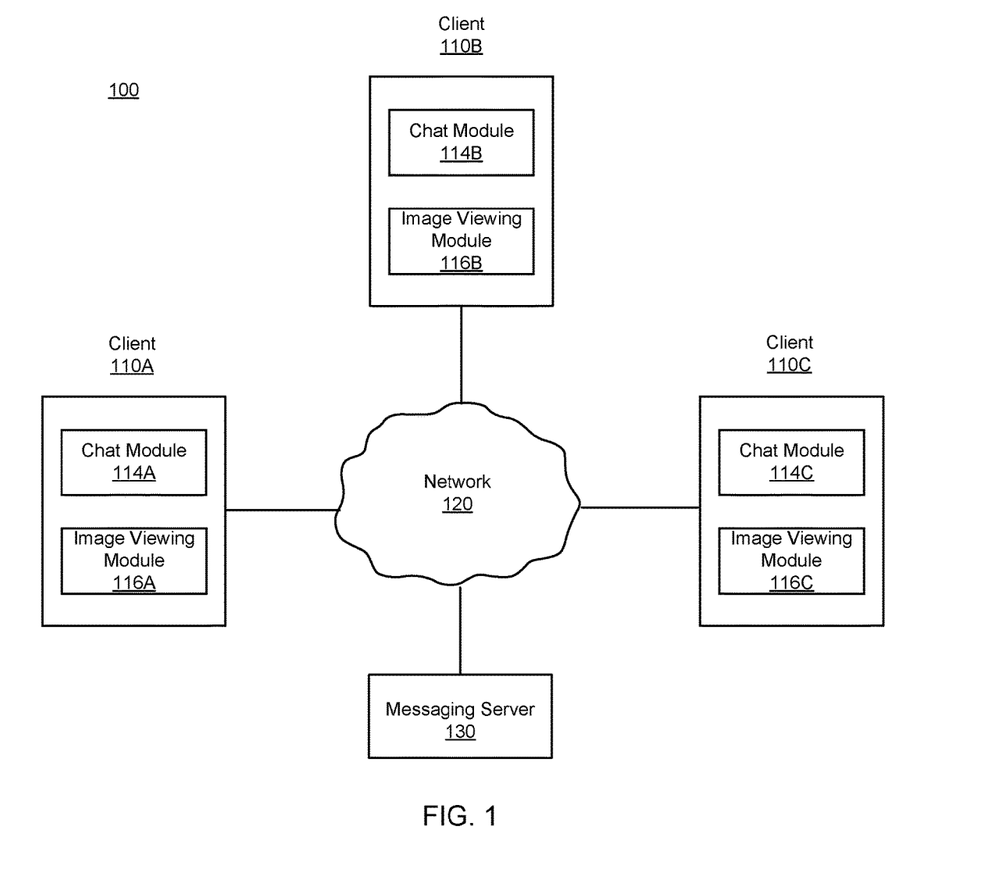
FIG. 1 is a high-level block diagram of a illustrating a system environment including a messaging server.

FIG. 1 is a high-level block diagram of a system environment including a messaging server 130. The environment 100 includes clients 110 connected to the messaging server 130 via a network 120. While only three clients 110 and one messaging server 130 are shown in FIG. 1, embodiments of the environment 100 can have many such entities connected to the network 120. Likewise, the functions performed by the various entities of FIG. 1 may differ in different embodiments.

FIG. 1 uses like reference numerals to identify like elements. A letter after a reference numeral, such as "110A," indicates that the text refers specifically to the element having that particular reference numeral. A reference numeral in the text without a following letter, such as "110," refers to any or all of the elements in the figures bearing that reference numeral. For example, "110" in the text refers to reference numerals "110A," "110B," and/or "110C" in the figures.

A client 110 is a computing device that can transmit and/or receive data via the network 120. A user may use a client 110 to perform functions such as communicating with other clients, executing software applications for various purposes, and consuming electronic content such as content hosted by web servers on the network 120. For example, the client 110 may be a smart phone, or a tablet or notebook computer. The client 110 includes a display on which the user may view content such as electronic messages and images. In addition, the client 110 includes a user interface (UI), such as physical and/or on-screen buttons, with which the user may interact to perform various functions.

The client 110 executes one or more applications ("apps") that extend the functionality of the client. The apps may include a web browser that allows the client 110 to interact with websites provided by servers connected to the network 120. The apps may also include one or more dedicated apps for accessing the messaging server 130. In one embodiment, the user downloads and installs apps on the client 110 for specific purposes, such as engaging in one-on-one or group messaging using the messaging server 130. Alternatively, the functionality of an app may be incorporated into an operating system of the client 110 or included in other native functionality of the client.

The client 110 includes a chat module 114 and an image viewing module 116. Depending upon the embodiment, the chat module 114 and/or the image viewing module 116 may be integrated into the operating system or other software executing on the client.

The chat module 114 represents an app for interacting with the messaging server 130 via the network 120. The chat module 114 enables a user of the client 110 to exchange electronic messages with one or more other client users (collectively called chat "participants"). The exchanged messages may include text, images, video, multimedia content, and location information. Depending upon the embodiment, the chat module 114 may exchange messages by directly communicating with chat modules of other clients (e.g., using peer-to-peer techniques) or by communicating the information through the messaging server 130. In one embodiment, the chat module 114 receives references to storage locations of images shared to the chat and uses the references to fetch the images. The storage locations may be at the messaging server 130 or elsewhere on the network 120. The chat module 114 may also allow the user to perform other actions relating to messages, such as providing feedback to the messaging server 130 regarding received messages.

A user of the chat module 116 can exchange messages with one or more other users. The exchange of messages between a set of users is referred to herein as a message "context." The context is also sometimes referred to as a "thread." The messages within a particular context can be exchanged one-to-one, one-to-many, or many-to-many. Generally, users can only access messages within contexts in which they are participants. Users cannot access messages within contexts in which they are not participants.

The image viewing module 116 interacts with the chat module 114 and may also interact with the messaging server 130 via the network 120 to enable a user to view images, videos, and other multimedia content (collectively referred to as "images") shared to chats in which the user participates. The image viewing module 116 may also be used to view images from other sources, such as images captured using a camera of the client 110 or images downloaded from websites on the network 120.

The image viewing module 116 supports an album mode in which the user can scroll through an ordered set of images. In this mode, the image being viewed by the user, referred to as the "focus image" is presented in a central position on the display of the client 110 overlaid on a background. The size of the focus image is reduced (e.g., cropped) so that at least two sides of the image (e.g., the top and bottom) do not extend to the corresponding edges of the display. The adjacent images in the album are partly displayed adjacent to the two reduced sides of the image. There are gaps between the adjacent images and the focus image. The background shows through the gaps and appears as separator bars visually separating the focus image from the adjacent images. These bars serve as a visual signal to the user that there are additional images available for viewing in the album. Moreover, the partly-displayed adjacent images indicate the directions the user can scroll through the album in order to view particular adjacent images.

Furthermore, if the user scrolls the focus image in the direction of an adjacent image, the size of the focus image gradually expands in an amount consistent with the distance indicated by the scroll until the entire focus image is presented. At this point, the user may continue scrolling and the focus image will scroll off the display. The scrolling also causes an adjacent image to scroll onto the display and become the new focus image. Accordingly, the user can use a scrolling gesture to view the full extent of the initial focus image, and also view adjacent images. The image viewing module 116 thus improves the operation of the client 110 by visually signaling how the user can interact with the client to order to achieve certain functionalities, and by providing a consistent set of interactions.

The messaging server 130 interacts with the chat module 114 and the image viewing module 116 of the clients 110 via the network 120 to facilitate exchanges of messages and images among the clients 110. In one embodiment, messaging server 130 receives messages created by users of clients 110 (e.g., by the users typing messages on keyboards, taking photographs, making audio recordings, or the like), and distributes the messages to other users participating in the associated contexts. In another embodiment, the messaging server 130 interacts with the clients 110 to facilitate the clients exchanging messages directly using a peer-to-peer protocol.

The network 120 enables communications among the clients 110 and the messaging server 130 and can comprise the Internet as well as mobile telephone networks. In one embodiment, the network 120 uses standard communications technologies and/or protocols. The data exchanged over the network 120 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. The messages exchanged by the clients 110 can also be encrypted. The entities can use custom and/or dedicated data communications technologies instead of, or in addition to, the ones described above.

Figure 2:
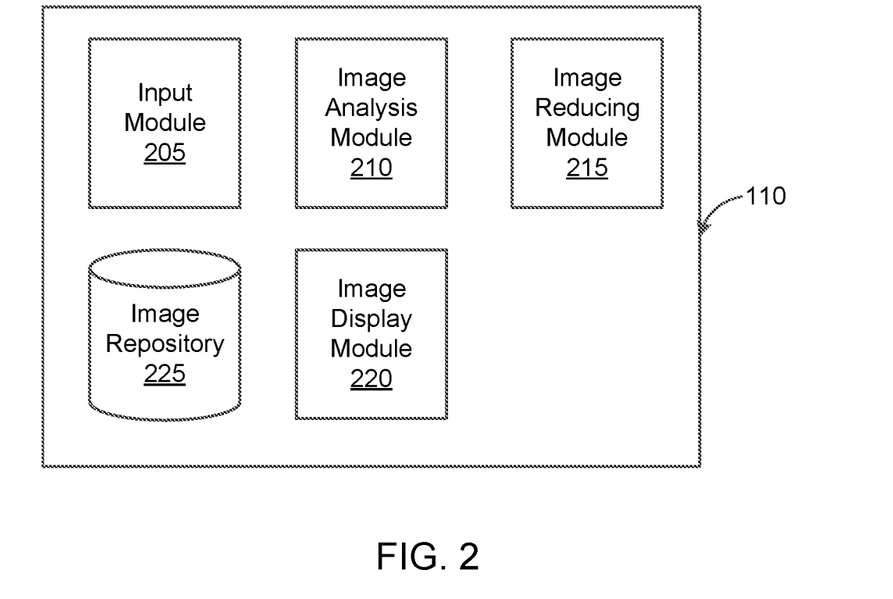
FIG. 2 is a block diagram showing additional details of the chat module of a client, according to one embodiment.

FIG. 2 is a high-level block diagram illustrating a detailed view of the image viewing module 116 of a client 110, according to one embodiment. As shown in FIG. 2, the image viewing module 116 includes an input module 205, an image analysis module 210, an image reducing module 215, an image display module 220, and an image repository 225. Those of skill in the art will recognize that other embodiments of the image viewing module 116 can have different and/or other modules than the ones described here, and that the functionalities can be distributed among the modules in a different manner.

The image repository 225 stores images. In one embodiment, the image repository is a database or other data structure supporting the storage and retrieval of images and other information. As mentioned above, the images may be deposited in the image repository 225 from a variety of sources, such as from chats supported by the chat module 114, from a camera of the client 110, or from websites on the network 120. The image repository 225 stores images at locations specified by image references. Each image has an associated reference, and the image can be accessed by supplying the reference to the image repository 225. At least some of the images in the repository 225 may be stored remotely at a location on the network 120 (e.g., in the cloud) and the repository may retrieve and cache these images on demand. The image repository 225 can store given images in perpetuity or for a limited time.

The images in the repository 225 are arranged into one or more albums. An album is a collection of one or more images, and a typical album includes at least several images. The images in an album are arranged in a sequential order based on ordering criteria. The ordering criteria can be based on when the images were acquired, when the images were sent in a chat context, and/or other criteria. Aside from the first and last images in the album, a given image has a pair of adjacent images that respectively come before and after the given image in the sequential order of the album. The first and last images in the album may lack one adjacent images, or the order may loop back to the other end of the order to form a continuous loop of images.

In addition, a given image in the image repository 225 has display attributes, such as resolution and aspect ratio. The image resolution describes the amount of pixels in the image. The aspect ratio, in turn, describes the ratio of the width to the height of the image. Often, the resolution of an image will exceed the resolution of the client display. The client 110 will therefore automatically scale the image to match display resolution. The aspect ratio for an image may or may not match the aspect ratio of the client's display. If the aspect ratios of the image and display are different, the client 110 typically scales the image to fit the entire image on the display, and uses letterboxing (e.g., black bars) or similar techniques to occupy the portions of the display not containing the image. Assume for purposes of this description that the images displayed by the client are scaled to fit the client display. Thus, an operation performed on the image, such as reducing by cropping, is performed on the scaled image.

The input module 205 receives and interprets user input to the client 110 and provides the inputs to the other modules in the image viewing module 116. In one embodiment, images (such as photos, video thumbnails, and other multimedia content) are initially displayed in an inline display mode such that the images scroll with the rest of a chat conducted using the chat module 114. Responsive to a user selecting an image (e.g., by tapping on the image with the user's finger or a stylus), the input module 205 instructs the image viewing module 116 to transition to the album mode. In the album mode, the selected image is the focus image. The images adjacent to the focus image in the album mode are those that are adjacent to the focus in the album in which the images are contained. The input module 205 may receive scroll commands from the user while in the album mode. For example, the user may drag a finger in a particular direction on the display of the client to indicate a directional scroll. The input module 205 relays such scroll commands to the other modules in the image viewing module 116.

In album mode, the image analysis module 210 determines how to display the focus image. In particular, the image analysis module 210 determines whether the focus image should be reduced in size for display to the user. In one embodiment, the image analysis module 210 compares the height of the focus image with a threshold height. If the focus image has greater than the threshold height, the image analysis module 210 determines that the image height should be reduced to the threshold height. The threshold height may be represented as a percentage of the vertical dimension of the client display (e.g., the display height). In one embodiment, the display height used to generate the threshold includes only available display area (i.e., does not include areas occupied by other features, such as icons or menus). In other embodiments, the relevant display height is the entire height of the display of the client 110.

Generally, the threshold is set to allow the focus image to be displayed along with the separator bars and portions of adjacent images. For example, the threshold may be expressed as 70% of the display height, which allows 30% of the display height for the display elements other than the focus image. If the focus image has less than the threshold height, the image analysis module 210 determines that the size of the image does not need to be reduced because the bar and portions of the adjacent images can be displayed without reducing the size of the focus image.

The image reducing module 215 reduces the size of the focus image responsive to an instruction from the image analysis module 210. In one embodiment, the size reduction is accomplished by cropping the focus image to reduce the image to the threshold height. "Cropping" refers to removing outer parts of the image to decrease the size (e.g., height) of the remaining image. The image reducing module 215 may crop the image by producing a reducing signal indicating how the image is to be reduced (e.g., which parts of the image are to be cropped). The original version of the image maintained in the image repository 225 is not altered. In other embodiments, the image reducing module 215 reduces the height of the focus image by scaling down the focus image while preserving the aspect ratio until the image occupies the threshold height.

In some embodiments in which the image reducing module 215 crops the focus image, the image is cropped equally at the top and the bottom until the image occupies the threshold height. Alternatively, the image reducing module 215 crops the image only at the top or bottom or unequally from both the top and the bottom. For example, in some embodiments, the image reducing module 215 determines which portions of the focus image contain important features of the image (e.g., a person's face) and which contain less important features (e.g., space above the person's head). If the image reducing module 215 determines that any less important features on the top or bottom of the image can be removed without having a significant impact on the overall appearance of the image, the image reducing module may crop only the top or bottom of the image or to crop more from one than the other.

The image display module 220 displays images on the screen of the client 110 based on instructions from the input module 205 and the reducing signal from the image reducing module 215. If the focus image is not reduced (i.e., the reducing signal indicates not to reduce the size of the image), the image display module 220 displays the focus image in a central position on the display of the client 110. The focus image is overlaid on a background and the portions of the images adjacent to the focus image in the containing album are displayed adjacent to the focus image. The adjacent images are set apart from the focus image so that the background shows through the gaps between the adjacent image and the focus image and appears as separator bars.

If the user provides a scroll command (e.g., by moving a finger toward the top or bottom of the screen), the image display module 220 scrolls the non-reduced images in an amount and direction consistent with the distance indicated by the command. The scroll causes the current focus image to scroll out of the focus position and an adjacent image to scroll into the focus position. Responsive to scrolling a new image into the focus position, the image display module 220 instructs the image analysis module 210 to determine whether to reduce the size of the new focus image.

If the focus image is reduced (i.e., the reducing signal indicates to reduce the size of the image), the image display module 220 displays the focus image in a central position on the display of the client 110. The image display module 220 shows the displayed image reduced according to the reducing signal. For example, the image display module 220 may display the image with top and bottom portions cropped. As with the non-reduced focus image, the focus image is overlaid on a background and the portions of the images adjacent to the focus image in the containing album are displayed adjacent to the focus image. The adjacent images are set apart from the focus image so that the background shows through the gaps between the adjacent image and the focus image and appears as separator bars. The separator bars and adjacent images occupy the spaces on the display created by reducing the size of the image. For example, if the full size of the image occupies 100% of the client's display, image display module 220 may allocate 70% of the display height to the focus image, 5% to the separator bars above and below the focus image, and 12.5% to each of the adjacent images.

If the user provides a scroll command, the image display module 220 initially linearly decreases the image reduction. That is, responsive to the scroll command, image display module 220 increases the size of the image by an amount determined linearly from the scroll distance indicated by the scroll command (e.g., by decreasing the cropped area and showing previously-cropped portions of the image). The center uncropped portion of the focus image remains anchored in the same position on the display of the client 110 while the sizes of the spaces on the top and bottom of the focus image occupied by the separator bars and adjacent images are reduced. In one embodiment, the displayed distance between the edges of the focus image and the adjacent image remains constant as the size of the focus image increases. Said another way, the width of the separator bars remains constant as the focus image grows. As a result, the adjacent images move off of the display as the focus image expands to occupy more of the display.

When the focus image is expanded to full size (e.g., is no longer cropped), it may occupy the full display of the client so that no separator bars are visible. Alternatively, the focus image may occupy less than the full size of the display so that the separator bars, and perhaps portions of the adjacent images are visible. Regardless, continued scrolling by the user causes the image display module 220 to scroll the focus image off the screen in the direction of the scroll and to display the adjacent image in the album in the focus position. As noted above, responsive to a new image entering the focus position, the image display module 220 instructs the image analysis module 210 to determine whether to reduce the size of the new focus image.

Figure 3:
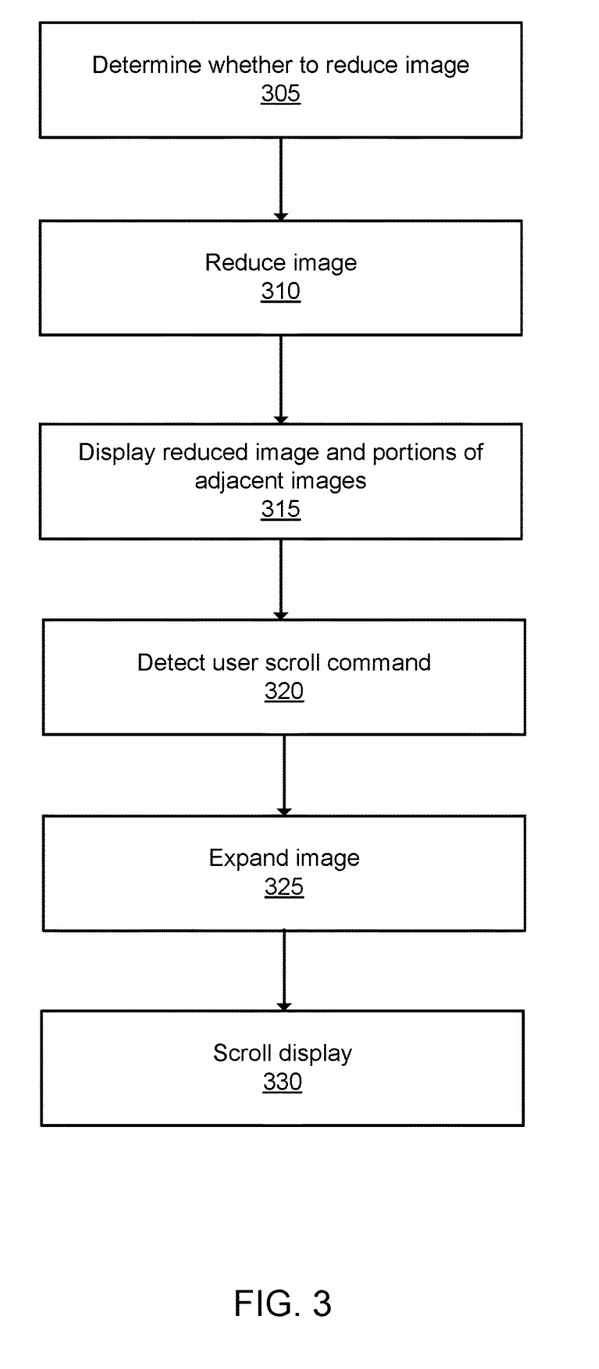
FIG. 3 is a flow diagram illustrating interactions among the entities of FIG. 1 to support vertical scrolling of album images, according to one embodiment.

FIG. 3 illustrates one embodiment of a method for display and scrolling of album images. The steps of FIG. 3 represent the perspective of the image viewing module 116. However, some or all of the steps may be performed by other modules or entities. In addition, some embodiments may perform the steps in parallel, perform the steps in different orders, or perform different steps.

In the embodiment shown in FIG. 3, the method begins with the image viewing module 116 determining 305 whether to reduce the size of an image occupying a focus position of the display in album mode. As discussed previously, the image viewing module 116 measures the height of the image relative to the height of the display of the client 110 and determines whether the image exceeds a threshold height (e.g., a specified percentage of the display height).

Responsive to the image viewing module 116 determining that the height of the focus image is greater than the threshold height, the image viewing module crops or otherwise reduces 310 the height of the image to the threshold height. In one embodiment, the image viewing module 116 crops 310 the image equally from the top and the bottom until the cropped image height is equal to the threshold (e.g., until the cropped image occupies 70% of the display of the client 110). In another embodiment, the image viewing module 116 crops the image from only the top or the bottom or unequally from both the top and the bottom, as discussed above with respect to FIG. 2. In still other embodiments, the image viewing module 116 scales down the image to the threshold height.

The image viewing module 116 displays 315 the cropped image (or the uncropped image if the image was less than the threshold height) in a focus position on the display. In one embodiment, the focus image and the adjacent images are overlaid on a background such that portions of the background show as separator bars above and below the focus image. That is, the bars indicate a visual separation between the focus image and the adjacent images in the album.

The image viewing module 116 detects 320 a scroll command from the user and scrolls the displayed images in an amount consistent with the distance indicated by the scroll command. In embodiments where the full focus image is displayed, the image viewing module 116 scrolls 330 the display such that some or all of the focus image moves out of the focus position and an adjacent image moves into the focus position. Responsive to a new image entering the focus position, the image viewing module 116 determines whether to reduce the height of the new image.

In embodiments where the focus image is cropped or otherwise reduced in size, the image viewing module 116 expands 325 the focus image responsive to the scroll distance and reduces the spaces produced by the cropping. That is, the image viewing module 116 linearly decreases the cropped area (i.e., linearly restores the portions of the image that were cropped to increase the size of the image) by an amount dependent on the amount of scroll indicated by the user such that more of the cropped image is displayed.

Responsive to additional scrolling, the image viewing module 116 continues to expand the image until the image fully expands, at which point the focus image may occupy the entire display of the client 110 such that the spaces produced by the cropping are eliminated. Continued scrolling causes the image viewing module 116 to scroll the current focus image out of the focus position and an adjacent image into the focus position. Responsive to scrolling a new image into the focus position, the image viewing module 116 compares the height of the new image to the threshold to determine whether to reduce the size of the new image.

Figure 4A:
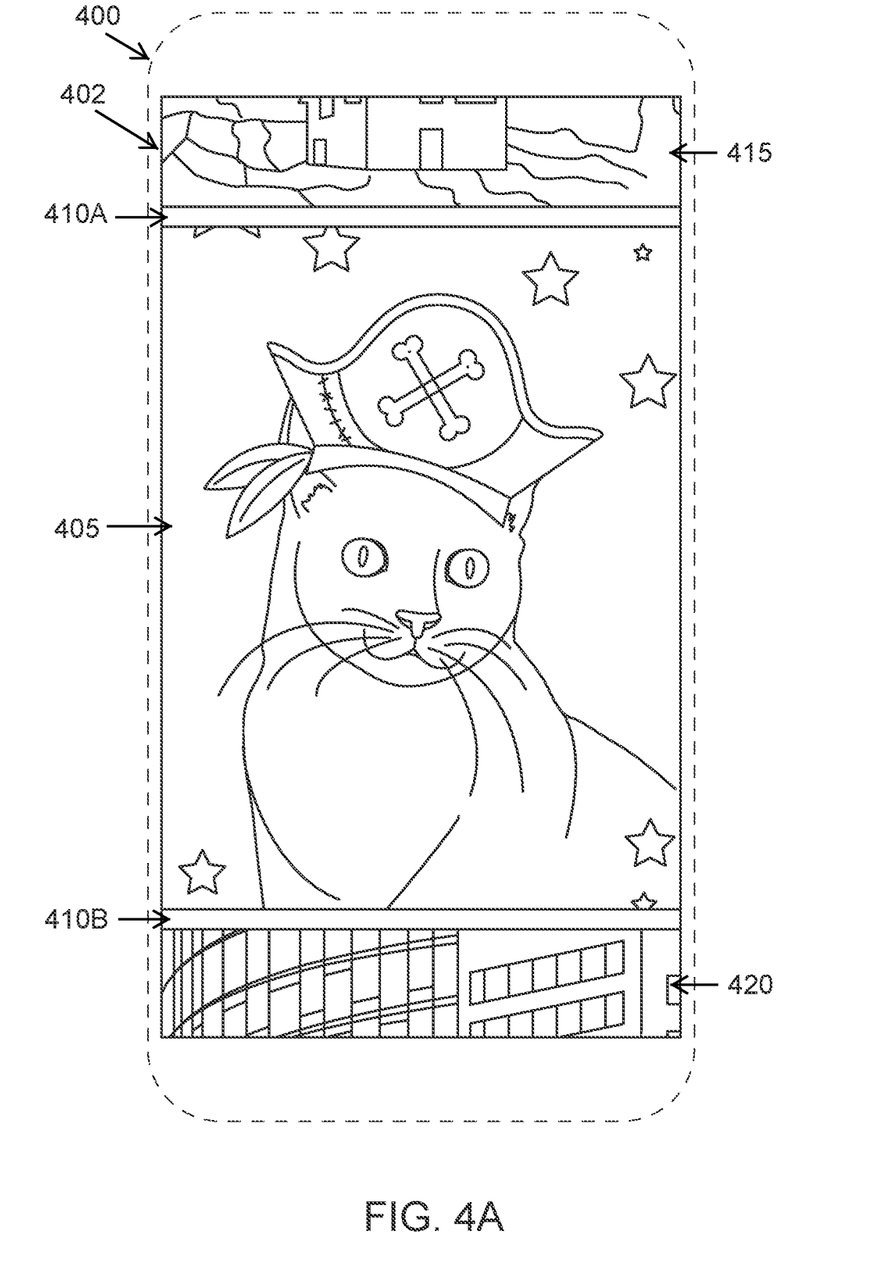
FIGS. 4A-4E are example user interfaces on the client showing a focus image in various scrolled states, according to one embodiment.

FIGS. 4A-4E are example user interfaces on the client 110 showing an album mode in which the focus image in is various scrolled states, according to one embodiment. FIG. 4A shows a front face 400 of the client 110 represented by a dashed line. The client 110 also includes a display 402 disposed on the front face 400. FIG. 4A and other figures show the display 402 in a portrait mode orientation however the same techniques may be used with displays in landscape mode orientation. In addition, this description refers to scrolling up and or toward the top and bottom of the display 402. The techniques described herein can also be used with left and right scrolling.

As shown in FIG. 4A, a focus image 405 is shown on the display 402. The focus image 405 is flanked by separator bars 410 separating the focus image from the top image 415 and the bottom image 420 in the album. In the embodiment shown in FIG. 4A, the focus image 405 is cropped equally from the top and bottom. Also shown in FIG. 4A are portions of the top image 415 above the focus image 405 and the bottom image 420 below the focus image, which are separated from the cropped focus image by the separator bars 410. Depending upon the embodiment, the top image 415 may be the image ordered immediately prior to the focus image 405 in the album while the bottom image 420 may be the image ordered immediately after the focus image in the album, or vice-versa.

As shown, the separator bars 410 extend from the respective edges of the focus image to the respective edges of the adjacent images. That is, the top 410A separator bar 410A is disposed between the top of the focus image 405 and the bottom edge of the top image 415 while the bottom separator bar 410B is disposed between the bottom of the focus image and the top of the bottom image 420. The separator bars 410 and portions of the adjacent images 415, 420 occupy the space on the display 402 made available by the cropping of the focus image 405.

Figure 4B:
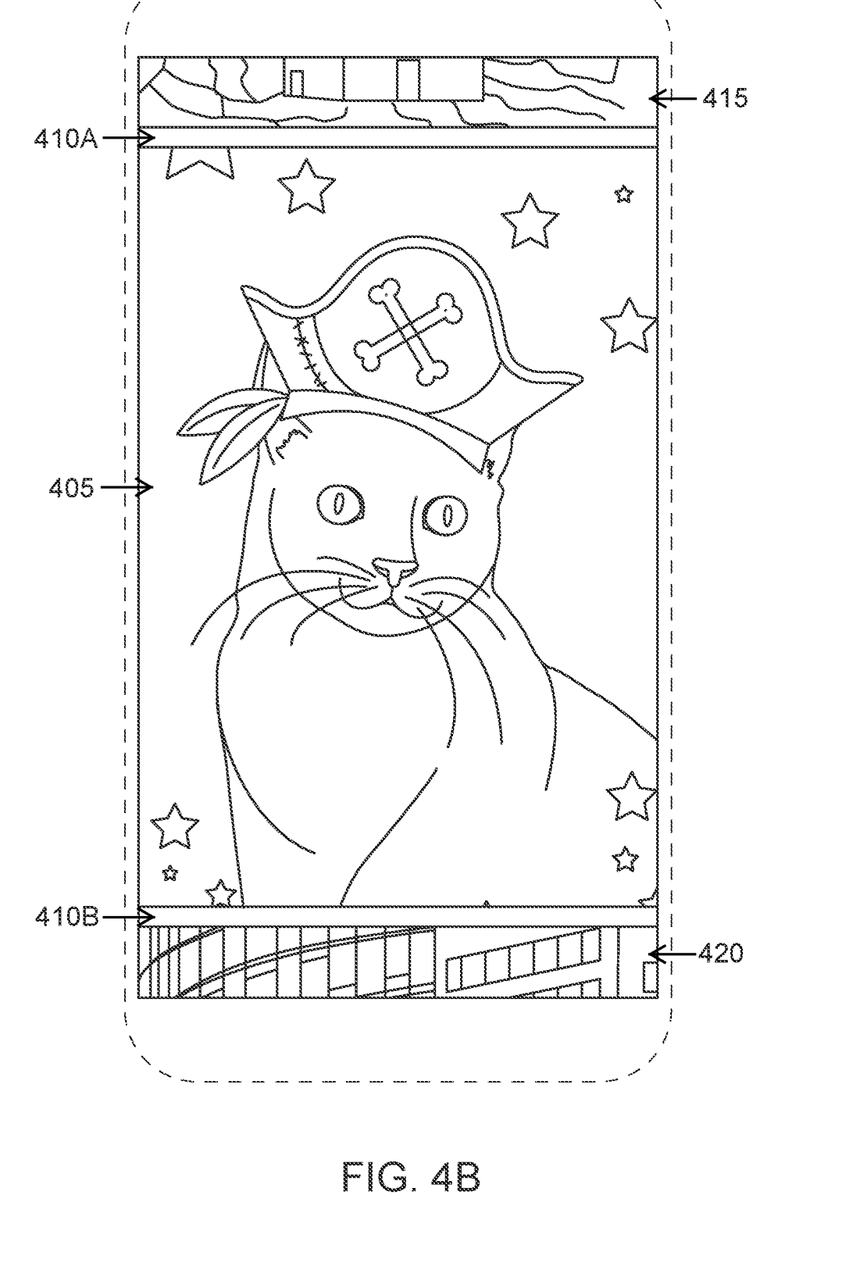

FIG. 4B shows the result of a user scroll command on the display 402 of the client 110. The center portion of the focus image 405 remains anchored at the same location in the display 402. The scroll command causes the focus image 405 to expand by displaying previously-cropped portions at the top and bottom of the image. The expansion of the focus image causes the spaces at the top and bottom of the focus image occupied by the separator bars and adjacent images to decrease. Specifically, the top 410A and bottom 410B separator bars move toward the top and bottom of the display 402, respectively, to reveal the previously-cropped portions. In addition, the top 415 and bottom 420 images move with the separator bars so that less of these images are displayed.

Figure 4C:
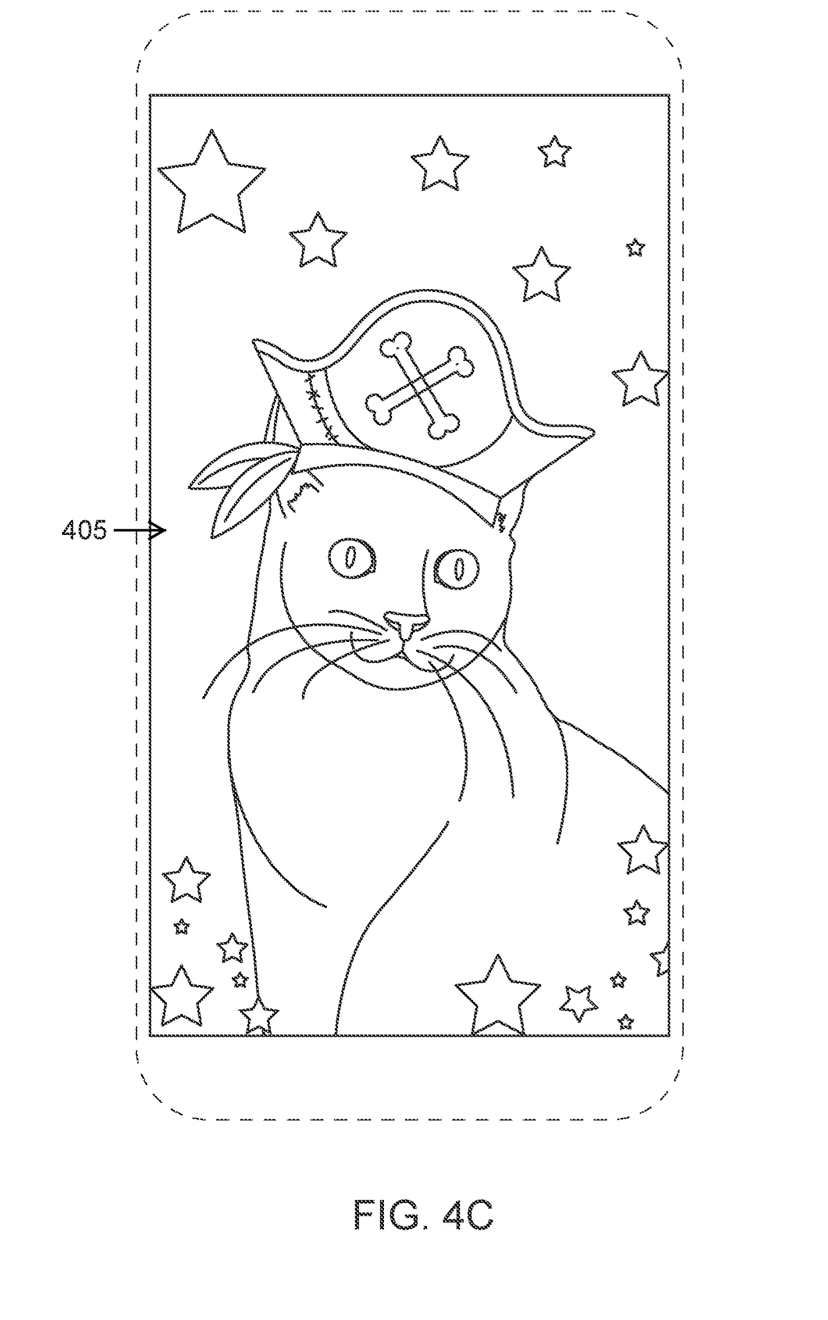

FIG. 4C shows the result of a scroll command continued past the point shown in FIG. 4B. In FIG. 4C, the focus image 405 is fully expanded such that it occupies the entire display 402. The separator bars 410 and adjacent images 415, 420 have fully moved off of the display 402 and disappear.

Figure 4D:
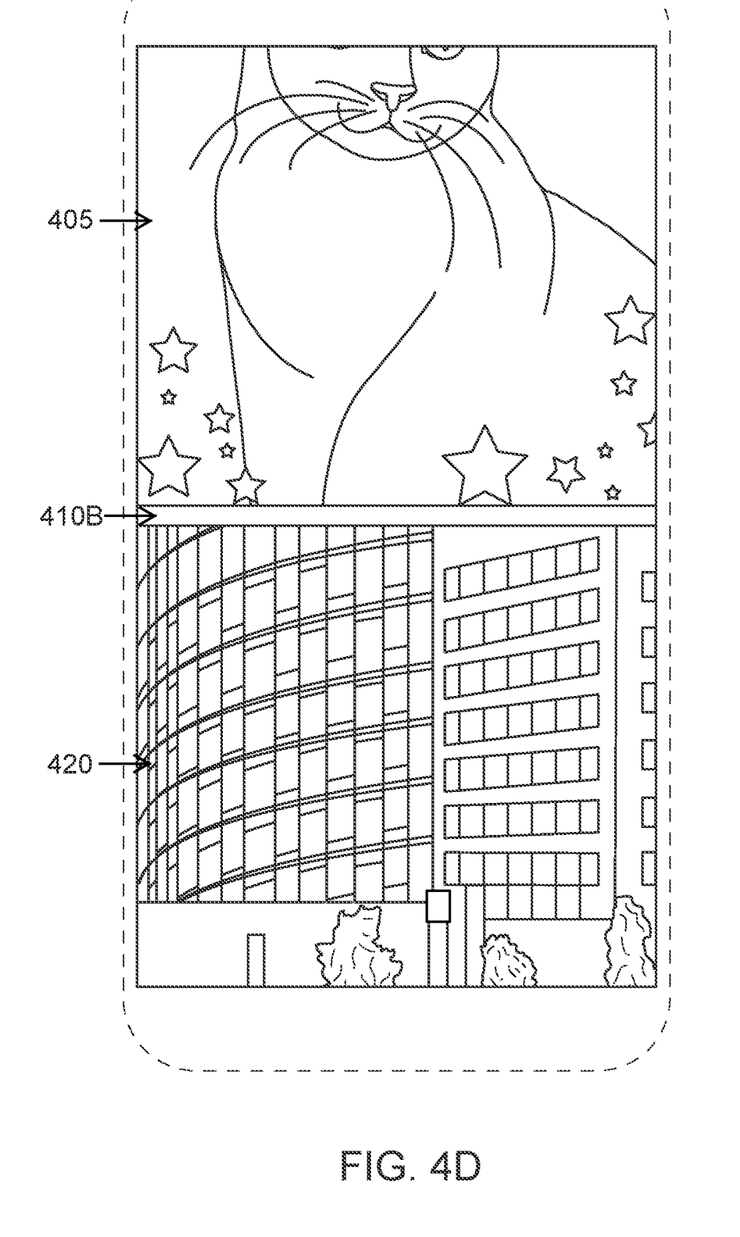

FIG. 4D shows the result of an upward scroll command continued past the point shown in FIG. 4C. The upward scroll causes the expanded focus image 405 to move upwards off the display 402 and the bottom image 420 to move towards the focus position from the bottom of the display. The separator bar 410B separating the focus image 405 from the bottom image 420 reappears between the two images. Continued upward scrolling will cause the bottom image 420 to become the new focus image.

Figure 4E:
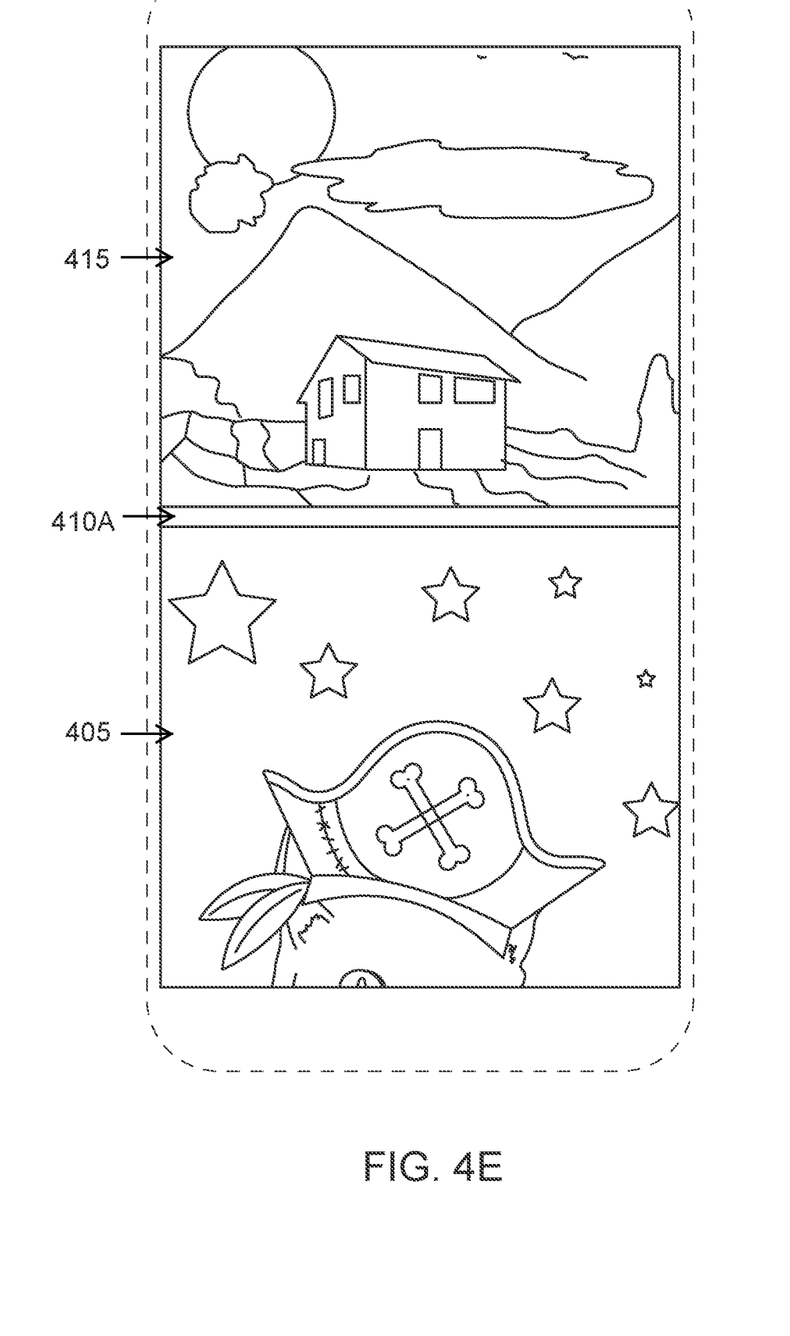

FIG. 4E shows the result of a downward scroll command continued past the point shown in FIG. 4C. The downward scroll causes the expanded focus image 405 to move downward off the display 402 and the top image 415 to move towards the focus position from the top of the display. The separator bar 410A separating the focus image 405 from the top image 415 reappears between the two images. Continued upward downward will cause the top image 415 to become the new focus image.

Figure 5:
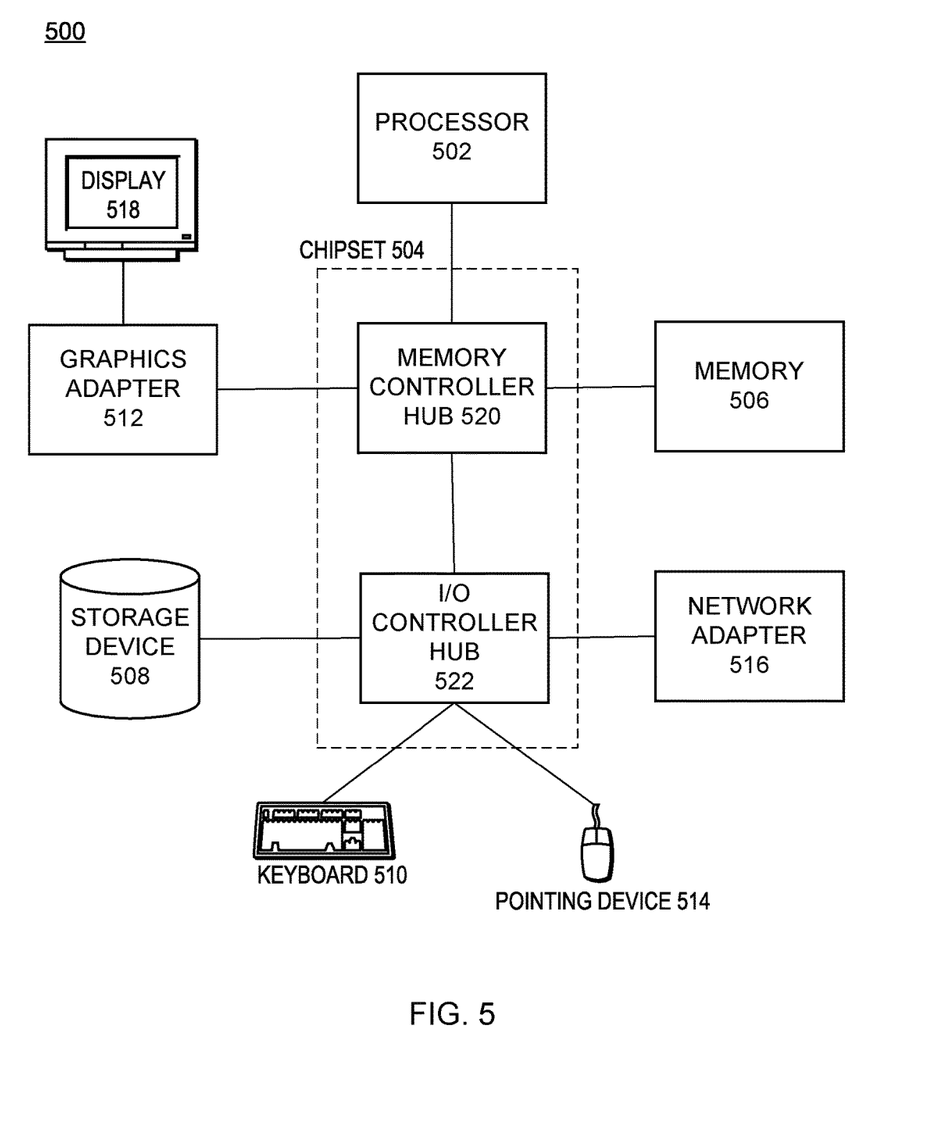
FIG. 5 is a high-level block diagram of a computer for acting as the client or server, according to one embodiment.

The entities shown in FIG. 1 are implemented using one or more computers. FIG. 5 is a high-level block diagram of a computer 500 for acting as a client 110 or a messaging server 130 in one embodiment. Illustrated are at least one processor 502 coupled to a chipset 504. Also coupled to the chipset 504 are a memory 506, a storage device 508, a keyboard 510, a graphics adapter 512, a pointing device 514, and a network adapter 516. A display 518 (which may be the same as the display 402 illustrated in FIG. 4) is coupled to the graphics adapter 512. In one embodiment, the functionality of the chipset 504 is provided by a memory controller hub 520 and an I/O controller hub 522. In another embodiment, the memory 506 is coupled directly to the processor 502 instead of the chipset 504.

The storage device 508 is any non-transitory computer-readable storage medium, such as a hard drive, compact disk read-only memory (CD-ROM), DVD, or a solid-state memory device. The memory 506 holds instructions and data used by the processor 502. The pointing device 514 may be a mouse, track ball, or other type of pointing device, and is used in combination with the keyboard 510 to input data into the computer system 500. The graphics adapter 512 displays images and other information on the display 518. The network adapter 516 couples the computer system 500 to the network 120.

As is known in the art, a computer 500 can have different and/or other components than those shown in FIG. 5. In addition, the computer 500 can lack certain illustrated components. For example, the computer acting as the messaging server 130 can be formed of multiple blade servers linked together into one or more distributed systems and lack components such as keyboards and displays. Moreover, the storage device 508 can be local and/or remote from the computer 500 (such as embodied within a storage area network (SAN)).

As is known in the art, the computer 500 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 508, loaded into the memory 506, and executed by the processor 502.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

The invention claimed is:

1. A method comprising:
showing a focus image at a focus position on a display of a client, wherein a height of the focus image is cropped to produce top and bottom spaces on the display and the focus image is from an image album;
showing on the display at least a portion of a top image from the album above the focus image and at least a portion of a bottom image from the album below the focus image, the top and bottom images respectively occupying at least parts of the top and bottom spaces on the display;
showing on the display a top separator bar disposed between the focus image and the top image and a bottom separator bar disposed between the focus image and the bottom image, the top and bottom separator bars respectively occupying at least parts of the top and bottom spaces on the display;
receiving, by the client, a vertical scroll command to scroll the focus image vertically on the display; and
responsive to receiving the vertical scroll command, increasing the height of the focus image and reducing sizes of the top and bottom spaces shown in the display of the client, wherein increasing the height of the focus image comprises linearly restoring cropped top and bottom portions of the focus image responsive to an amount of scroll indicated by the vertical scroll command.

2. The method of claim 1, wherein showing on the display a top separator bar disposed between the focus image and the top image and a bottom separator bar disposed between the focus image and the bottom image comprises:
overlaying the displayed focus image, the top image, and the bottom image over a background;
wherein the top image is positioned adjacent to the focus image to expose a top gap through which the background shows to produce the top separator bar and the bottom image is positioned adjacent to the focus image to expose a bottom gap through which the background shows to produce the bottom separator bar.

3. The method of claim 1, further comprising:
comparing the height of the focus image to a threshold, the threshold determined responsive to a height of the display; and
reducing the height of the focus image responsive to the comparison to the threshold.

4. The method of claim 1, wherein the image album includes a plurality of ordered images and wherein the top image and the bottom image are adjacent to the focus image in an order of the plurality of images in the album.

5. The method of claim 1, further comprising:
responsive to receiving a second vertical scroll command after receiving the vertical scroll command, further increasing the height of the focus image to occupy the top and bottom spaces; and
responsive to receiving a third vertical scroll command after receiving the second vertical scroll command, scrolling the focus image off the display.

6. The method of claim 1, wherein a center portion of the focus image remains anchored at a same position on the display of the client as the height of the focus image is increased.

7. A non-transitory computer-readable storage medium storing computer program instructions executable by a processor to perform operations comprising:
showing a focus image at a focus position on a display of a client, wherein a height of the focus image is cropped to produce top and bottom spaces on the display and the focus image is from an image album;
showing on the display at least a portion of a top image from the album above the focus image and at least a portion of a bottom image from the album below the focus image, the top and bottom images respectively occupying at least parts of the top and bottom spaces on the display;
showing on the display a top separator bar disposed between the focus image and the top image and a bottom separator bar disposed between the focus image and the bottom image, the top and bottom separator bars respectively occupying at least parts of the top and bottom spaces on the display;
receiving, by the client, a vertical scroll command to scroll the focus image vertically on the display; and
responsive to receiving the vertical scroll command, increasing the height of the focus image and reducing sizes of the top and bottom spaces shown in the display of the client, wherein increasing the height of the focus image comprises linearly restoring cropped top and bottom portions of the focus image responsive to an amount of scroll indicated by the vertical scroll command.

8. The medium of claim 7, wherein showing on the display a top separator bar disposed between the focus image and the top image and a bottom separator bar disposed between the focus image and the bottom image comprises:
overlaying the displayed focus image, the top image, and the bottom image over a background;
wherein the top image is positioned adjacent to the focus image to expose a top gap through which the background shows to produce the top separator bar and the bottom image is positioned adjacent to the focus image to expose a bottom gap through which the background shows to produce the bottom separator bar.

9. The medium of claim 7, further comprising:
comparing the height of the focus image to a threshold, the threshold determined responsive to a height of the display; and
reducing the height of the focus image responsive to the comparison to the threshold.

10. The medium of claim 7, wherein the image album includes a plurality of ordered images and wherein the top image and the bottom image are adjacent to the focus image in an order of the plurality of images in the album.

11. The medium of claim 7, further comprising:
responsive to receiving a second vertical scroll command after receiving the vertical scroll command, further increasing the height of the focus image to occupy the top and bottom spaces; and responsive to receiving a third vertical scroll command after receiving the second vertical scroll command, scrolling the focus image off the display.

12. The medium of claim 7, wherein a center portion of the focus image remains anchored at a same position on the display of the client as the height of the focus image is increased.

13. A system comprising:
- a computer processor for executing computer program instructions; and
- a non-transitory computer-readable storage medium storing computer program instructions executable by the processor to perform operations comprising:
- showing a focus image at a focus position on a display of a client, wherein a height of the focus image is cropped to produce top and bottom spaces on the display and the focus image is from an image album;
- showing on the display at least a portion of a top image from the album above the focus image and at least a portion of a bottom image from the album below the focus image, the top and bottom images respectively occupying at least parts of the top and bottom spaces on the display;
- showing on the display a top separator bar disposed between the focus image and the top image and a bottom separator bar disposed between the focus image and the bottom image, the top and bottom separator bars respectively occupying at least parts of the top and bottom spaces on the display;
- receiving, by the client, a vertical scroll command to scroll the focus image vertically on the display; and
- responsive to receiving the vertical scroll command, increasing the height of the focus image and reducing sizes of the top and bottom spaces shown in the display of the client, wherein increasing the height of the focus image comprises linearly restoring cropped top and bottom portions of the focus image responsive to an amount of scroll indicated by the vertical scroll command.

14. The system of claim 13, wherein showing on the display a top separator bar disposed between the focus image and the top image and a bottom separator bar disposed between the focus image and the bottom image comprises:
- overlaying the displayed focus image, the top image, and the bottom image over a background;
- wherein the top image is positioned adjacent to the focus image to expose a top gap through which the background shows to produce the top separator bar and the bottom image is positioned adjacent to the focus image to expose a bottom gap through which the background shows to produce the bottom separator bar.

15. The system of claim 13, further comprising:
- comparing the height of the focus image to a threshold, the threshold determined responsive to a height of the display; and
- reducing the height of the focus image responsive to the comparison to the threshold.

16. The system of claim 13, wherein the image album includes a plurality of ordered images and wherein the top image and the bottom image are adjacent to the focus image in an order of the plurality of images in the album.

17. The system of claim 13, further comprising:
- responsive to receiving a second vertical scroll command after receiving the vertical scroll command, further increasing the height of the focus image to occupy the top and bottom spaces; and
- responsive to receiving a scroll third vertical scroll command after receiving the second vertical scroll command, scrolling the focus image off the display.

* * * * *